United States Patent [19]

Gong et al.

[11] Patent Number: 5,378,882
[45] Date of Patent: Jan. 3, 1995

[54] BAR CODE SYMBOL READER WITH LOCKING CABLE CONNECTOR ASSEMBLY

[75] Inventors: Frank Gong, Williston Park; Yuri Gofman, Brooklyn; Alex Breytman, Bellmore, all of N.Y.

[73] Assignee: Symbol Technologies, Inc., Bohemia, N.Y.

[21] Appl. No.: 952,409

[22] Filed: Sep. 30, 1992

Related U.S. Application Data

[63] Continuation-in-part of Ser. No. 943,244, Sep. 11, 1992, abandoned.

[51] Int. Cl.⁶ .............................................. G06K 7/10
[52] U.S. Cl. ................................... 235/472; 439/314; 439/320
[58] Field of Search ................. 235/472; 439/314, 320

[56] References Cited
U.S. PATENT DOCUMENTS

| | | | |
|---|---|---|---|
| 1,209,842 | 12/1916 | Hunt | 439/320 |
| 1,718,185 | 6/1929 | Van Deventer . | |
| 2,261,989 | 11/1941 | Gallup . | |
| 2,378,105 | 6/1945 | Roesch | 439/314 |
| 2,716,225 | 8/1955 | McCubbin . | |
| 2,787,770 | 4/1957 | Arson | 439/314 |
| 3,116,942 | 1/1964 | Morello | 439/314 |
| 3,123,662 | 3/1964 | Fink . | |
| 3,141,713 | 7/1964 | Kauffman . | |
| 3,493,205 | 2/1970 | Bromberg . | |
| 3,656,083 | 4/1972 | Brook . | |
| 3,811,104 | 5/1974 | Caldwell . | |
| 3,975,074 | 8/1976 | Fuller | 439/320 |
| 3,986,765 | 10/1976 | Shaffer et al. | 439/314 |
| 4,142,769 | 3/1979 | Wood | 439/314 |
| 4,180,301 | 12/1979 | Hutter | 439/314 |
| 4,251,798 | 2/1981 | Swartz et al. . | |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,496,831 | 1/1985 | Swartz et al. | 235/472 |
| 4,531,800 | 7/1985 | Avener . | |
| 4,593,186 | 6/1986 | Swartz et al. | 235/472 |
| 4,607,156 | 8/1986 | Koppenaal et al. | 235/472 |
| 4,673,803 | 6/1987 | Zerle et al. | 235/436 |
| 4,715,833 | 12/1987 | Mobley et al. | 439/834 |
| 4,736,095 | 4/1988 | Shepard et al. | 235/472 |
| 4,740,168 | 4/1988 | Carney et al. | 439/133 |
| 4,758,717 | 7/1988 | Shepard et al. | 235/472 |
| 4,760,248 | 7/1988 | Swartz et al. | 235/472 |
| 4,806,742 | 2/1989 | Swartz et al. | 235/472 |
| 4,808,804 | 2/1989 | Krichever et al. | 235/462 |
| 4,816,660 | 3/1989 | Swartz et al. | 235/472 |
| 4,816,661 | 3/1989 | Krichever et al. | 235/472 |
| 4,845,350 | 7/1989 | Shepard et al. | 235/472 |
| 4,867,712 | 9/1989 | Kato et al. | 439/752 |
| 4,871,904 | 10/1989 | Metlitsky et al. | 235/467 |
| 4,891,017 | 1/1990 | Kuhn et al. | 439/380 |
| 5,099,110 | 3/1992 | Shepard et al. | 235/472 |
| 5,200,597 | 4/1993 | Eastman et al. | 235/472 |

Primary Examiner—John Shepperd

[57] ABSTRACT

A hand held bar code reader or scanner includes a universal locking cable connector assembly attaching a signal cable to the handle of the scanner. Signals and/or power to and from the scanner are carried by the signal cable. The signal cable is removably connected to a connector recessed in the handle of the scanner. The signal cable includes (i) a connector member attached to a terminal end thereof and engagable with the connector of the scanner handle and (ii) a collar adjacent the connector. A plastic retaining member is positionable over the collar and includes an internal stepped bore forming a collar at one end of the retaining member for engaging the collar portion of the signal cable within the bore. A manually lockable bayonet or threaded portion of the retaining member is formed at an opposite end and cooperates with an internal surface of the scanner for securing the retaining member to the housing. With the retaining member secured to the handle of the scanner, the signal connector is electrically coupled with the connector of the scanner.

27 Claims, 6 Drawing Sheets

BAR CODE SYMBOL READER WITH LOCKING CABLE CONNECTOR ASSEMBLY

BACKGROUND OF RELATED APPLICATION

This is a continuation-in-part of Ser. No. 07/943,244 filed Sep. 11, 1992, now abandoned.

TECHNICAL FIELD

This invention generally relates to the field of hand-held electro-optic readers and, more particularly, to a locking connector assembly for removably attaching an electrical cable to a reader.

BACKGROUND ART

Optical readers, such as hand-held bar code readers, are conventionally used to read and interpret bar code data printed on articles offered for sale, items subject to inventory, and many other media. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate and readily connectable to an associated host system and/or external power source.

A variety of scanning devices are known. One particularly advantageous type of reader is an optical scanner which scans a beam of light, such as a laser beam, across the symbols. Laser scanner systems and components of the type exemplified by U. S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708— all of these patents and patent applications being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, of an associated host system or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard, and may include an initial recognition of the particular standard the scanned symbol conforms to. Recognition of the standard is referred to as autodiscrimination. Typically, the various decoder functions are performed by a microprocessor, with associated program memory and random access data memory.

Figure 10:
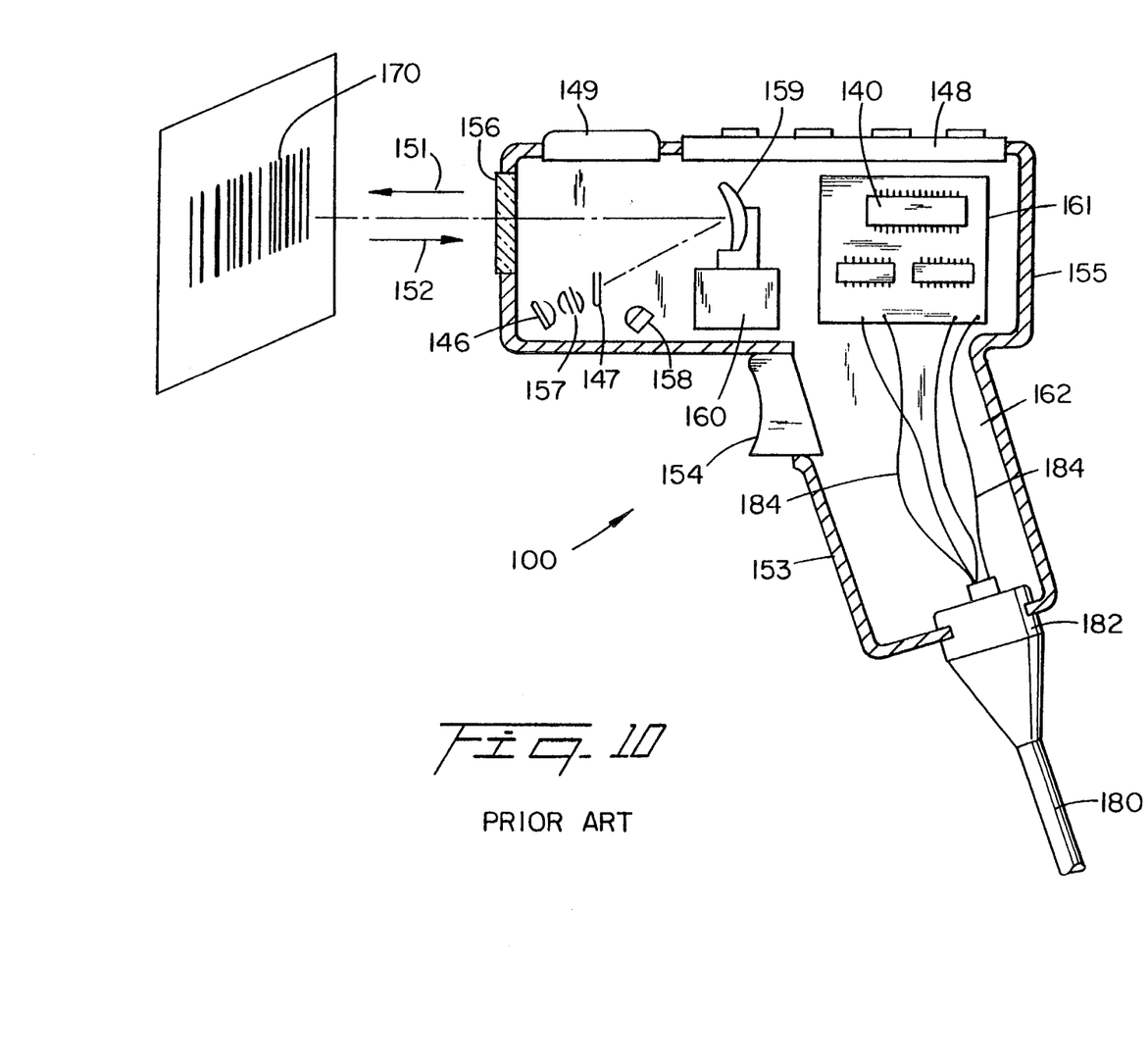
FIG. 10 is a partial sectional view of a hand-held bar code reader according to the prior art.

FIG. 10 illustrates an example of a prior art bar code reader unit 100 implemented as a gun shaped device, having a pistol-grip type of handle 153. A lightweight plastic housing 155 contains laser light source 146, detector 158, optics and signal processing circuitry and CPU 140. The bar code reader is connected to an associated host system and/or receives power through cable 180. Cable 180 is permanently secured at an end of handle 153 by strain relief member 182. Wires 184 of cable 180 are internally attached to circuit board 161.

A light-transmissive window 156 in the front end of the housing 155 allows the outgoing light beam 151 to exit and the incoming reflected light 152 to enter. The reader 100 is designed to be aimed at a bar code symbol 170 by the user from a position in which the reader 100 is spaced from the symbol, i.e., not touching the symbol or moving across the symbol.

As further depicted in FIG. 10, a suitable lens 157 (or multiple lens system) may be used to focus the scanned beam into a scanning spot at an appropriate reference plane. A light source 146, such as a semiconductor laser diode, introduces a light beam into the axis of the lens 157, and the beam passes through a partially-silvered mirror 147 and other lenses or beam-shaping structure as needed. The beam is reflected from an oscillating mirror 159 which is coupled to a scanning motor 160 energized when the trigger 154 is pulled. The oscillation of the mirror 159 causes the reflected beam 151 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 152 reflected back by the symbol 170 passes back through the window 156 for application to the detector 158. In the exemplary reader 100 shown in FIG. 10, the reflected light reflects off of mirror 159 and partially-silvered mirror 147 and impacts on the light sensitive detector 158. The detector 158 produces an analog signal proportional to the intensity of the reflected light 152. This signal is processed and digitized by circuitry mounted on circuit board 161 and decoded by microprocessor 140.

To scan a symbol 170, a user aims the bar code reader unit 100 and operates movable trigger switch 154 to activate the light beam 151, the scanning motor 160 and the detector circuitry. If the scanning beam is visible, the operator can see the scan pattern on the surface on which the symbol appears and adjust aiming of the reader 100 accordingly. If the light produced by the source 146 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 100 may also function as a portable computer terminal. If so, the bar code reader 100 would include a keyboard 148 and a display 149, such as described in the previously noted U.S. Pat. No. 4,409,470.

Figure 11:
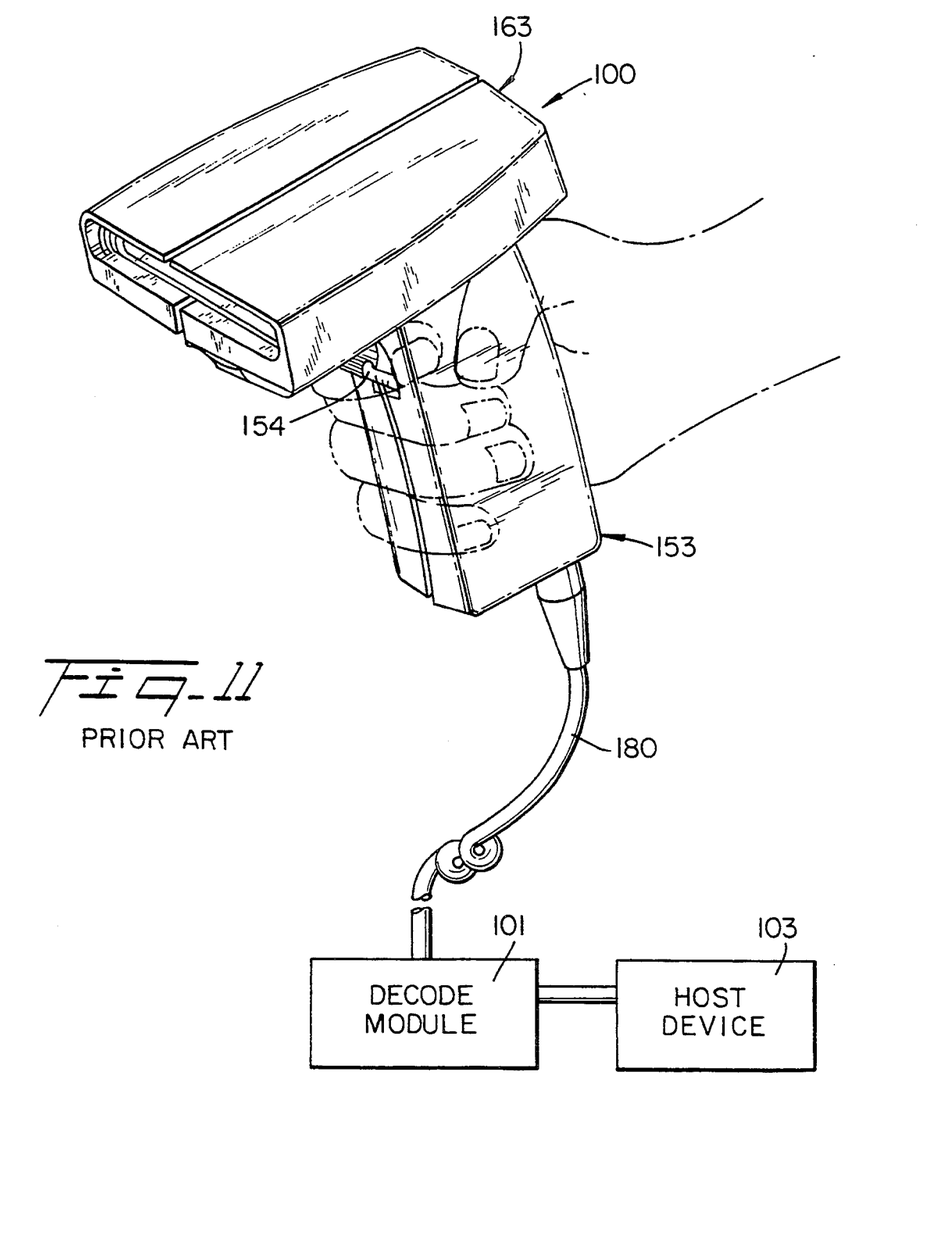
FIG. 11 is a perspective view of a hand-held scanner operated to supply information to a host device according to the prior art.

FIG. 11 is a diagram showing a reader 100 connected to host data equipment. Reader 100 includes a generally gun-shaped housing having a handle 153 of generally rectangular cross-section and generally elongated along a handle axis. A generally horizontally-elongated barrel portion 163 includes the optical scanning components for generating and directing a laser beam onto a target and detecting laser light reflected therefrom. The body and handle are constituted of lightweight, resilient, shock-resistant, self-supporting material, such as a synthetic plastic material. The plastic housing preferably is injection molded, but can be vacuum-formed or blow-molded to form a thin, hollow shell encasing the optical and electronic components supplying the output signals indicative of the detected light. These signals are provided by cable 180 to a decode module 101. Decode module 101 converts the signals representing the bar code into corresponding numeric data in either binary, binary-coded-decimal, or ASCII format which is supplied to host device 103 for further processing.

In optical scanners of the type discussed above, the scanner is attached to a host system and/or receives power through a permanently attached cable. While the cable may be attached by a removable multi-pin electrical connector to permit replacement or changing of the scanner device, conventional multi-pin electrical connectors are difficult to properly align and are prone to damage when handled by inexperienced personnel. Further, these connectors do not provide an environmentally sealed interface to prevent introduction of contaminants including dirt and dust into the scanner.

Some conventional multi-pin connectors include metallic screw rings for securely attaching the connector body to an electronic device. These structures can also provide some environmental protection of the electrical connectors and prevent the introduction of dust and dirt into the scanner. However, these connectors can be difficult to use and are easily damaged. Further, the metallic connectors must be manually assembled and are not readily adaptable to automated assembly techniques used for other multi-pin types of connectors.

Alternatively, plastic multi-pin connectors are used to connect equipment. However, plastic connectors are not durable, are easily dislodged, and do not provide adequate environmental protection.

From the above discussion of the state of the art, it becomes clear that a need exists for a connector assembly for attaching and securing a signal cable to a scan unit, the connector assembly being adaptable to automated assembly techniques, resistant to operator abuse and mishandling, and readily adaptable to a broad range of connector types including multi-pin electrical, fiber optic and coaxial signal cables.

DISCLOSURE OF THE INVENTION

One advantage of this invention is in the provision of a connector assembly for an optical scanning head sealed from the environmental. The connector forms a positive seal between a cable and the optical scanning head to avoid introduction of dust and other contaminants into the housing of the device.

Another advantage is in ease of assembly of a connector; no special tools are required. Thus, all components can be made of an easily fabricated material such as plastic and should be capable of manual attachment and removal.

Another advantage of the invention is in the provision of a connector assembly readily adaptable to different types of signal and power connectors including electrical and optical connectors. A two-piece design including mating electrical connectors and a universal type retaining cover provides an adaptable configuration for accommodating different types and configurations of electrical connectors.

Still another advantage of the invention is protection of a connector assembly and internal electronics from electrostatic discharge (ESD).

To achieve these and other advantages of the invention, a special elective connector assembly is mounted to an optical reader that may be used for scanning bar codes. As a first aspect of the invention, the reader is of a type that includes a housing having an upper head portion and a handle having an electrical socket in an end portion thereof. A light source is mounted in the head for generating an incident laser beam. Optics in the head optically form and direct the incident laser beam along an optical path toward indicia located in the optical path, thereby reflecting off the indicia reflected light. At least a returning portion of the reflected laser light travels away from the indicia back toward the system. Scanning structures in the head scan the indicia, the returning portion of the reflected laser light having a variable intensity over the scan.

A sensor mounted in the head detects the variable intensity of the returning portion of the reflected laser light over a field of view and generates an electrical analog signal indicative of the detected variable light intensity. The scanning structures are operative for scanning at least one of the incident laser beam and the field of view. A signal processor processes the analog electrical signal to supply a processed signal indicative of the indicia to the electrical socket.

An electrical cable is removably connected to the electrical socket for conducting the processed electrical signal to external equipment. A connector member, attached to a terminal end of the electrical cable assembly, includes a terminal electrical connector engagable with the electrical socket and a sleeve adjacent the terminal electrical connector.

A retaining member, preferably formed of an electrically insulating material such as plastic, is positionable over the sleeve and includes an internal stepped bore forming a collar at one end for retaining the sleeve within the bore. A locking bayonet or threaded portion is formed at an opposite end of the retaining member for cooperating with an internal bearing or threaded surface of the handle, securing the retaining member to the handle. With the retaining member secured to the handle, the terminal electrical connector is held in an operative position in communication with the electrical socket.

The bayonet type retaining member may include a cylindrical or similar shape barrel portion having two or more radially extending tabs. The tabs are evenly spaced about a periphery of the barrel, each tab having a ramped bearing surface for engaging the internal bearing surface of the handle. The threaded type retaining member includes an external screw thread engaging complementarily tapped inner walls of a cavity formed in the handle. Rotation of the retaining member within the handle portion draws the retaining member into sealed engagement with the handle portion.

According to another feature of the invention, the handle includes a cylindrical cavity in an end thereof for receiving the barrel portion of the retaining member. Inner side wall surfaces of the cavity have a ridge or stepped portion forming the internal bearing surface. The stepped portion of the inner side wall of the cavity may form a groove.

According to another feature of the invention, the retaining member includes a flange with a compressible gasket mounted thereon for seating the retaining member onto an outer surface of the handle surrounding the cylindrical cavity.

According to another feature of the invention, the retaining member includes opposing flat outer surface portions providing a gripping surface for transmitting a torque to the retaining member. By applying a torque to the retaining member, it is caused to rotate within the handle portion thereby coming into locking engagement therewith.

According to still another feature of the invention, the connector member includes a flexible cable strain relief portion surrounding a portion of electrical cable assembly and extending out from the bore of the retaining member with the retaining member secured within the handle portion.

According to another feature of the invention, the handle portion includes a cavity having an external aperture formed as a keyway for receiving the locking bayonet portion of the retaining member. The socket for receiving the electrical connector of the cable is mounted in an internal wall of the cavity opposite the aperture. Inner side walls of the cavity include the bearing surface. The electrical socket may be a standard modular telephone jack.

According to another aspect of the invention, an electronic device detects a signal and supplies the detected signal to an external device. The device is contained within a housing having a connector for supplying a signal. A signal detector receives a signal and supplies the received signal to the connector. A signal cable is removably connected to the connector for supplying the received signal to the external device.

The signal cable includes (i) a connector member and (ii) a collar portion longitudinally contiguous therewith in an axial direction. The connector member is attached to a terminal end of the cable and is engagable with the connector positioned in the housing. The collar portion is positioned immediately adjacent the terminal connector.

A retaining member is slidable along the cable into position over the collar. An internal stepped bore is formed axially within the retaining member, the stepped portion of the bore forming a collar at a one end of the retaining member for engaging, and thereby retaining, the collar portion of the signal cable within the bore. A manually lockable portion of the retaining member is formed at an opposite end and cooperates with an internal surface of the housing for lockably engaging and securing the retaining member to the housing. With the retaining member secured to the housing, the signal connector is held in an operative position in communication with the connector of the housing.

According to the method of the invention, hand-held sensing devices are disconnected and reconnected to a host system via a signal cable. In particular, the inventive method is used with an electronic system itself comprising a detachable hand-held sensing device and a host data system connected to the hand-held sensing device by a signal cable. The method accomplishes detaching a first hand-held sensing device from, and connecting a second hand-held sensing device to, the host data system.

The method includes manually rotating a retaining member securing a signal connector of the signal cable to the first hand-held sensing device thereby disengaging the retaining member therefrom. The retaining member is withdrawn from a cavity in the first hand-held sensing device to expose the signal connector. The signal connector is withdrawn from a receiving connector in the cavity in the first hand-held device. The signal connector is then inserted into a receiving connector of the second hand-held device. The retaining member is slid over the signal connector to engage a cavity in the second hand-held sensing device and manually rotated member to lock the retaining member into the cavity of the second hand-held sensing device.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BEST MODE FOR CARRYING OUT THE INVENTION

As used in this specification and in the appended claims, the term "symbol" broadly encompasses not only symbol patterns composed of alternating bars and spaces of various widths as commonly referred to as bar code symbols, but also other one or two dimensional graphic patterns, as well as alphanumeric characters. In general, the term "symbol" may apply to any type of pattern or indicia which may be recognized or identified by scanning a light beam and detecting reflected or scattered light as a representation of variations in light reflectivity at various points of the pattern or indicia. A bar code is one example of a "symbol" which the present invention can scan.

Figure 1:
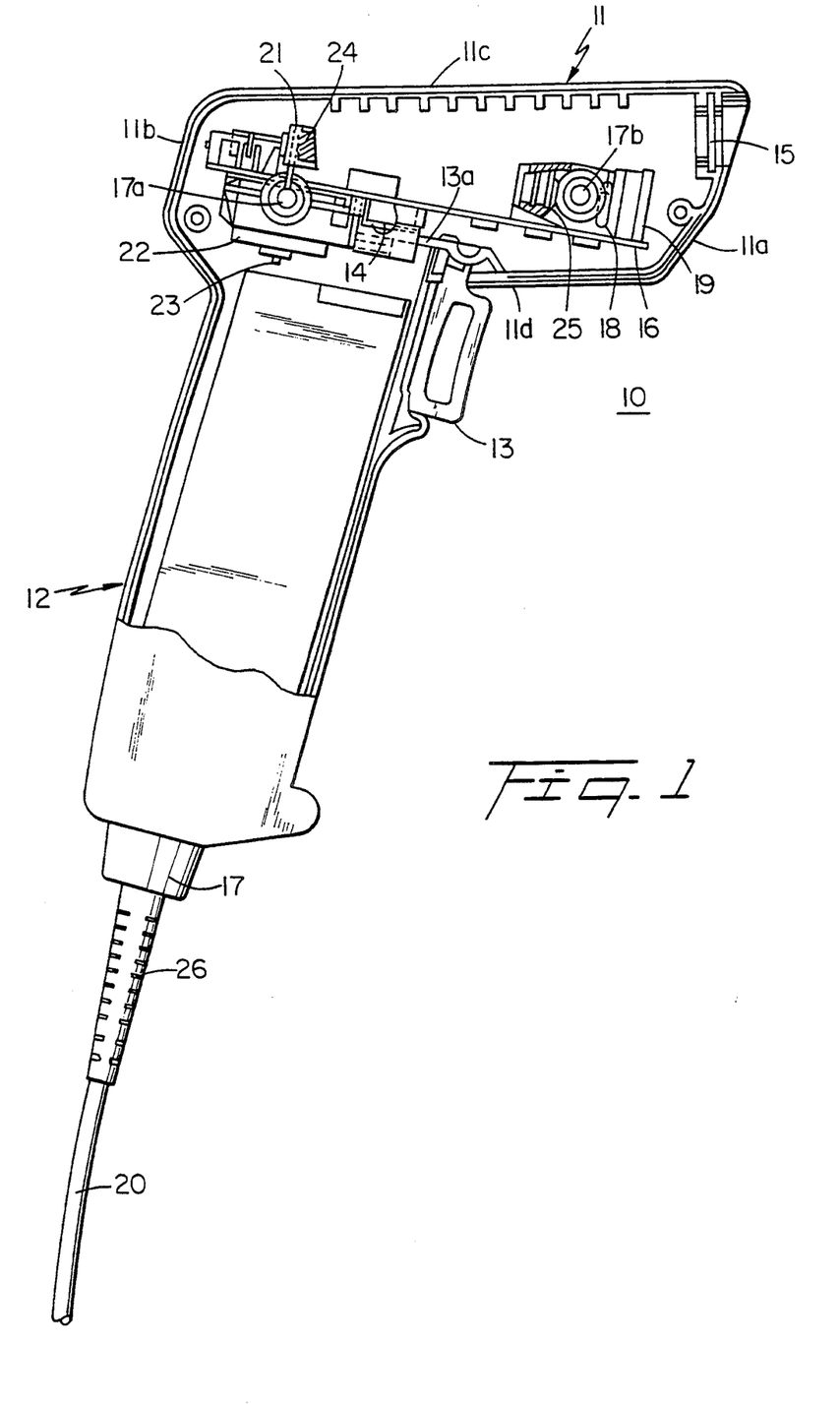
FIG. 1 is a partial sectional view of a hand-held bar code reader including a locking connector assembly according to the invention.

A preferred embodiment of the invention shown in FIG. 1. Details of the scanner optics and electronics are presented in allowed U.S. patent application Ser. No. 07/438,022 assigned in common with the instant invention and incorporated herein by reference. Body portion 11 has a front prow region or nose having an inclined front 11a and a rear region having a rear wall 11b spaced rearwardly of the inclined front wall 11a. Body portion 11 also has a top wall 11c, a bottom wall 11d below top wall 11c, and a pair of opposed side walls between the top and bottom walls. Front wall 11a is sloped relative to the top and bottom walls.

A manually-actuable, and preferably depressible, trigger 13 is mounted on a cantilever resilient arm 13a for moving relative to the head in a forwardly-facing region where the handle and body portions meet and where the user's forefinger normally lies when the user grips the handle portion in the intended position of use. The bottom wall 11d has a low opening, and handle 12 has a forwardly-facing slot through which trigger 13 projects and is moved. Arm 13a has one end overlying a trigger switch 14 which transitions from an open to a closed state upon depression of trigger 13. Window 15 is mounted in the nose and is light-transmissive to allow laser light to pass from the interior to the exterior of the head and back.

Thin, flexible circuit board 16 is shock-mounted in the head by shock mounts 17a and 17b. An optical assembly is mounted in the head on circuit board 16 and is adjustably positioned for optically modifying and directing an emitted laser beam from semiconductor laser diode 18. Upon activation by trigger 13, laser diode 18 propagates and generates an incident laser beam. Heat sink 19 conducts heat away from the diode.

Light beam emitted by laser diode 18 is highly divergent and non-radially symmetric, i.e. anamorphic. The diode may be of the continuous wave or pulse type, requiring a low voltage power source supplied by power conductors of electrical cable 20. A fixed focus plano-convex focusing lens (not shown) is positioned behind laser diode 18. Laser diode 18 and the lens are positioned within an elongated, cylindrical optical tube.

Light emitter laser diode 18 is rearwardly directed within the head by the optical assembly to a generally planar scanning mirror 21 for reflection therefrom. Scanning mirror 21 forwardly directs the laser beam impinging thereon through forwardly facing, laser-light-transmissive window 15 toward the symbol to be read. Scanning mirror 21 is reciprocally oscillated by high-speed scanning motor 22 through shaft 23.

A returning portion of the reflected laser light is collected by a generally concave, spherical collecting mirror 24 which reflects the collected conical light to photodiode 25. Collecting mirror 24 is commonly mounted with scanning mirror 21 to be oscillated by motor 22. Photodiode 25 detects the intensity of the collected laser light and supplies an analog signal indicative of the detected variable light intensity. The analog signal is process by circuitry mounted on circuit board 16, the processed signal being supplied to external associated circuitry and equipment via cable 20.

Cable 20 has a flexible strain relief portion 26 formed at a terminal end thereof made of a semiflexible insulating plastic. Strain relief member 26 prevents excessive bending of cable 20 near an attachment point at scanner handle 12. Locking retaining member 27 secures cable 20 into position into handle 12.

Figures 2, 3:
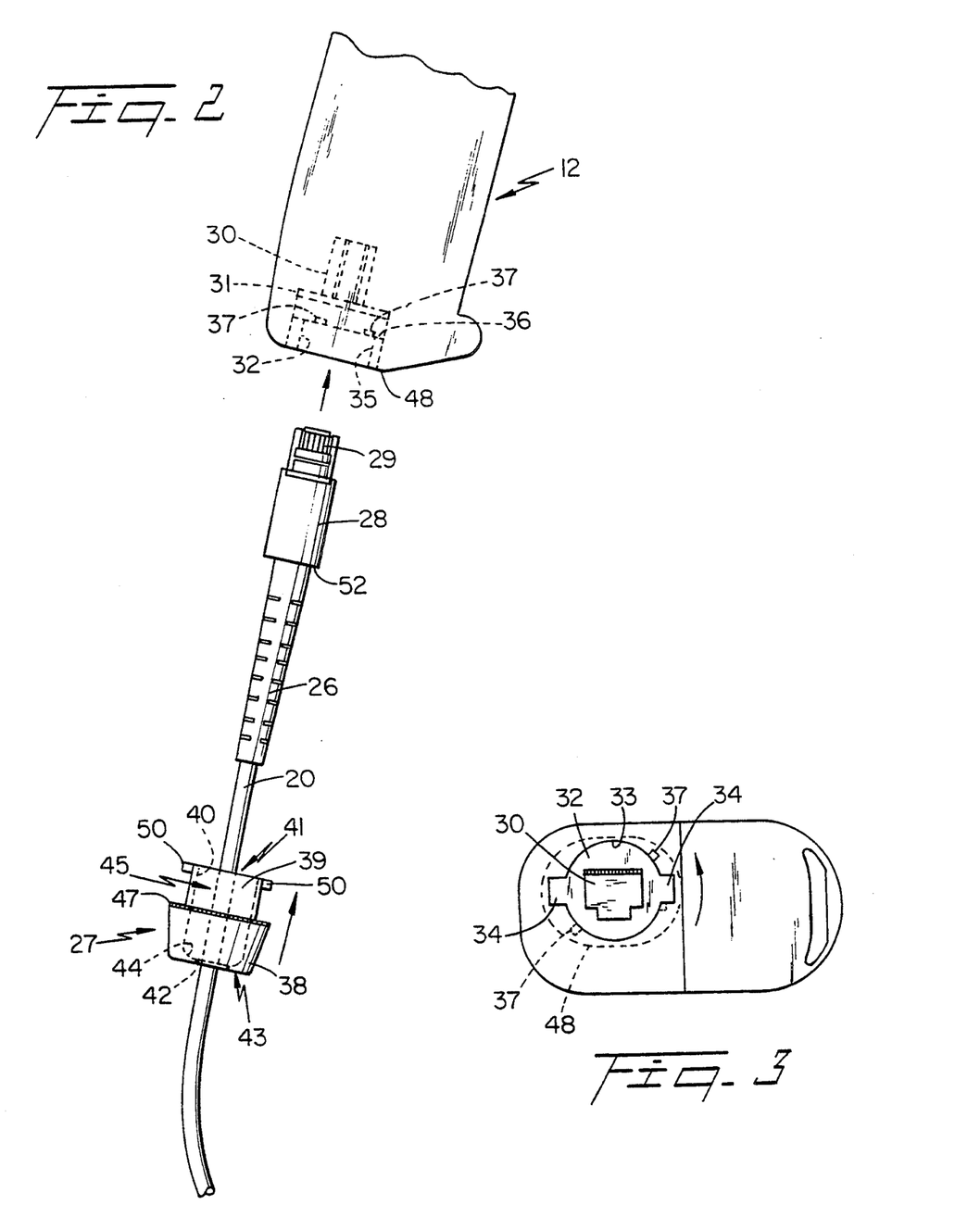
FIG. 2 is an exploded view of the locking connector assembly according to a first embodiment of the invention.
FIG. 3 is a bottom view of the handle of the hand-held bar code reader of FIG. 2 depicting details of the electrical socket mounted therein.
Figure 4:
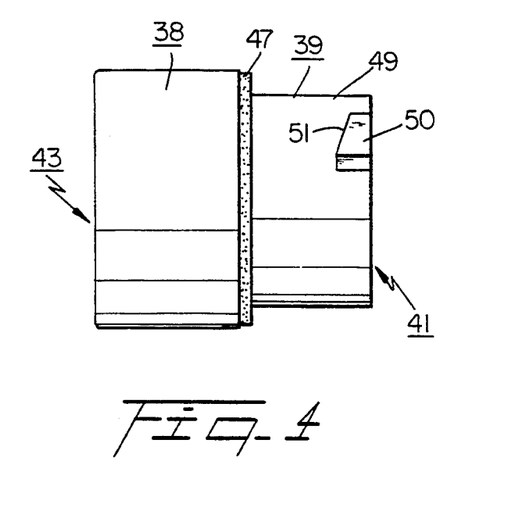
FIG. 4 is a side view of retaining member according to the first embodiment of the invention.
Figure 5:
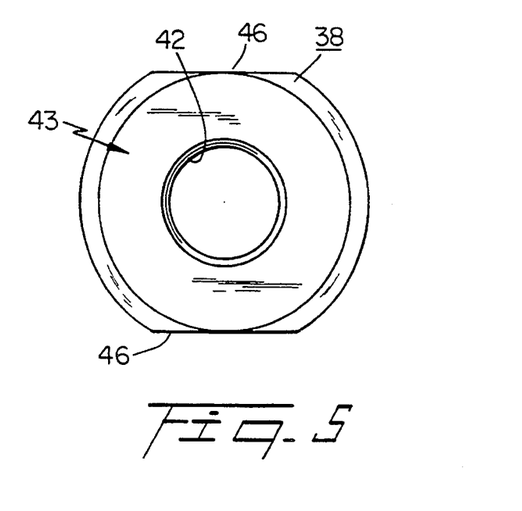
FIG. 5 is a front view of the retaining member of FIG. 4.
Figure 6:
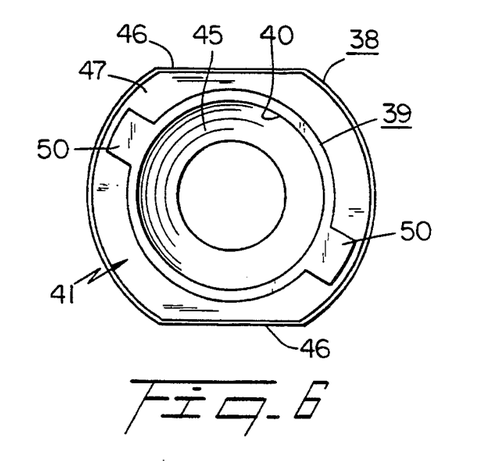
FIG. 6 is a rear view of the retaining member of FIG. 4.
Figure 7:
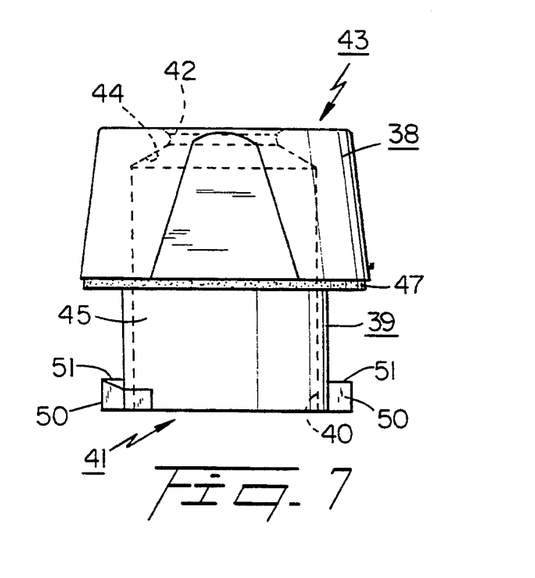
FIG. 7 is a side view of the retaining member of FIG. 4.

Referring to FIG. 2 depicting details of a first embodiment of the invention, locking retaining member 27 has a bayonet type mount which engages a corresponding bayonet type mounting aperture formed in scanner handle 12. Flexible strain relief member 26 is formed along cable 20, terminating in a generally cylindrical connector body 28. A male multi-pin connector 29 is formed at an opposite end of connector body 28. Connector 29 is similar to a conventional modular telephone plug but without a locking tab. Connector 29 is insertable into a corresponding female connector 30. Connector 30 is mounted in a recessed wall 31 of a cavity 32 formed in handle 12.

Referring to FIG. 3, cavity 32 has a double keyway shaped aperture 33 formed by a generally round central aperture portion and opposing square cutouts 34 extending radially out from the center of the aperture.

Inner sidewalls 35 of cavity 32 have formed therein a pair of opposing circumferential stepped surfaces 36 or grooves, each terminating at one end in a respective longitudinal channel, the longitudinal channels extending to the surface of handle 12 to form aperture extensions 34. An opposite end of each circumferential stepped surface 36 terminates in radial abutment 37 to limit rotation to a predetermined angle along the surface. The abutments or similar channel stop means are formed between 20 to 90 degrees and preferably within a range of 30 to 45 degrees along the side walls of cavity 32 as measured counterclockwise from the respective longitudinal channel viewed inwardly through the aperture.

Connector 30 is mounted in a recessed wall at a distal end of cavity 32 with an exposed insertion aperture for receiving a connector. Although various types of non-locking insertion connectors may be used, a preferred connector comprises a standard modular type RJ-XX telephone jack connector. To render the connector assembly non-locking and permit easy withdrawal of the corresponding modular plug without special tools, a locking tab conventionally formed on a standard modular telephone plug is omitted or removed.

Locking retaining member 27 is made of injection molded plastic and is slidable along cable 20 to receive cylindrical connector body 28 in a central bore formed in member 27. A remaining portion of cylindrical connector body 28 is received into cavity 32 so that connector 29 operatively engages mating connector 30 mounted in the opposite wall of the cavity. The electrical insulating property of plastic material protects the connector assembly and internal electronics of the scanner from electrostatic discharge (ESD).

Locking retaining member 27 includes longitudinally contiguous lower collar 38 and upper bayonet member 39. An axial bore 40 extends from an open end 41 of bayonet member 39 through a major portion of collar 38, tapering to a smaller diameter aperture 42 formed in the open end 43 of collar 38 to form an internal flange or collar 44 thereat. The central cavity 45 of locking retaining member 27 formed by bore 40 is sized to accept cylindrical connector body 28 while collar 44 engages a lower surface thereof.

The outer portion of collar 38 is formed generally cylindrical in shape or as a tapered frustum of a cone. A pair of opposing flats 46 (FIGS. 4-7) are formed in the outer surface of collar 38 to provide for manual gripping and rotation of member 27. A gasket 47 is mounted on an exposed outer ring-like surface of collar 38 surrounding bayonet member 39 for engaging and sealing to a lower surface 48 of handle 12 around aperture 33. Gasket 47 may be a foam or other compressible elastomer composition formed separately from locking retaining portion 27 and later mounted thereon. Alternatively, gasket 47 may be formed directly on plastic portion 27 by injection molding of an elastomer over the plastic to form a seal. The elastomer may be a polyurethane, flexible polyvinylchloride (pvc), rubber, or similar material.

Bayonet member 39 includes a cylindrical barrel 49 with opposing locking stubs 50 projecting radially outward from an outer surface of barrel 49 immediately adjacent an upper edge thereof. Locking stubs 50 have ramped surfaces 51 facing gasket 47 of collar 38 and are positioned and shaped on and with barrel 49 to correspond with the double keyway geometry of handle aperture 33.

Bayonet member 39 of locking retaining member 27 is insertable into cavity 32 of handle 12 through aperture 33. Manual rotation of bayonet member 39 by gripping flats 46 causes the ramped surfaces 51 of locking stubs 50 to engage the stepped surfaces 36 or groves formed in the side walls of cavity 32, acting as a camming surface and drawing gasket 47 of retaining member 27 into a sealed position against the lower surface of handle 12.

To attach a cable 20 to a scanner 10, the user first aligns male connector 29 to be received by female connector 30 and then inserts connector body 28 into handle cavity 32 until the connectors are coupled. With the connectors properly seated, a portion of connector body extends out from cavity 32. The user then slides retaining member 27 toward handle 12, inserting bayonet member 39 of retaining member 27 through the corresponding keyed opening of cavity 32. Travel into retaining member 27 is limited by the engagement of gasket 47 with the lower surface 48 of handle 12. At the same time, lower surface 52 of connector body 28 engages internal flange 44 of lower collar 38. Counterclockwise rotation of retaining member 27 produces a camming action whereby retaining member 27 is drawn in toward cavity 32 and into sealed locking engagement with handle 12. Rotation is limited to approximately 30 degrees of rotation upon side surfaces of locking stubs 50 contacting abutments 37. With retaining member 27 locked in position on handle 12, connector body 28 and connector 29 are sealed within the combined cavity formed by cavity 32 of handle 12 and cavity 45 of and retaining member 27. Flexible strain relief member 26 extends out through aperture 42.

Removal of cable 20 is accomplished by reversing the above described steps. Retaining member 27 is rotated in a clockwise direction approximately 30 degrees until locking stubs 50 engage respective side walls of the longitudinal channels formed in the side walls 35 of handle cavity 32. Retaining member 27 can then be withdrawn from cavity 32 and slid down along cable 20, exposing connector body 28. Pulling on connector body 28 disengages connector 29 from connector 30, completing disconnection of the cable from the scanner handle.

A second embodiment of the invention includes an alternate threaded or screw mount configuration for securing the retaining member to the scanner handle. In this second embodiment, an outer surface of the retaining surface is threaded to engage complementary threads formed in the tapped inner surface of the scanner handle. The second embodiment is similar to the first embodiment in other respects.

Figures 8, 9:
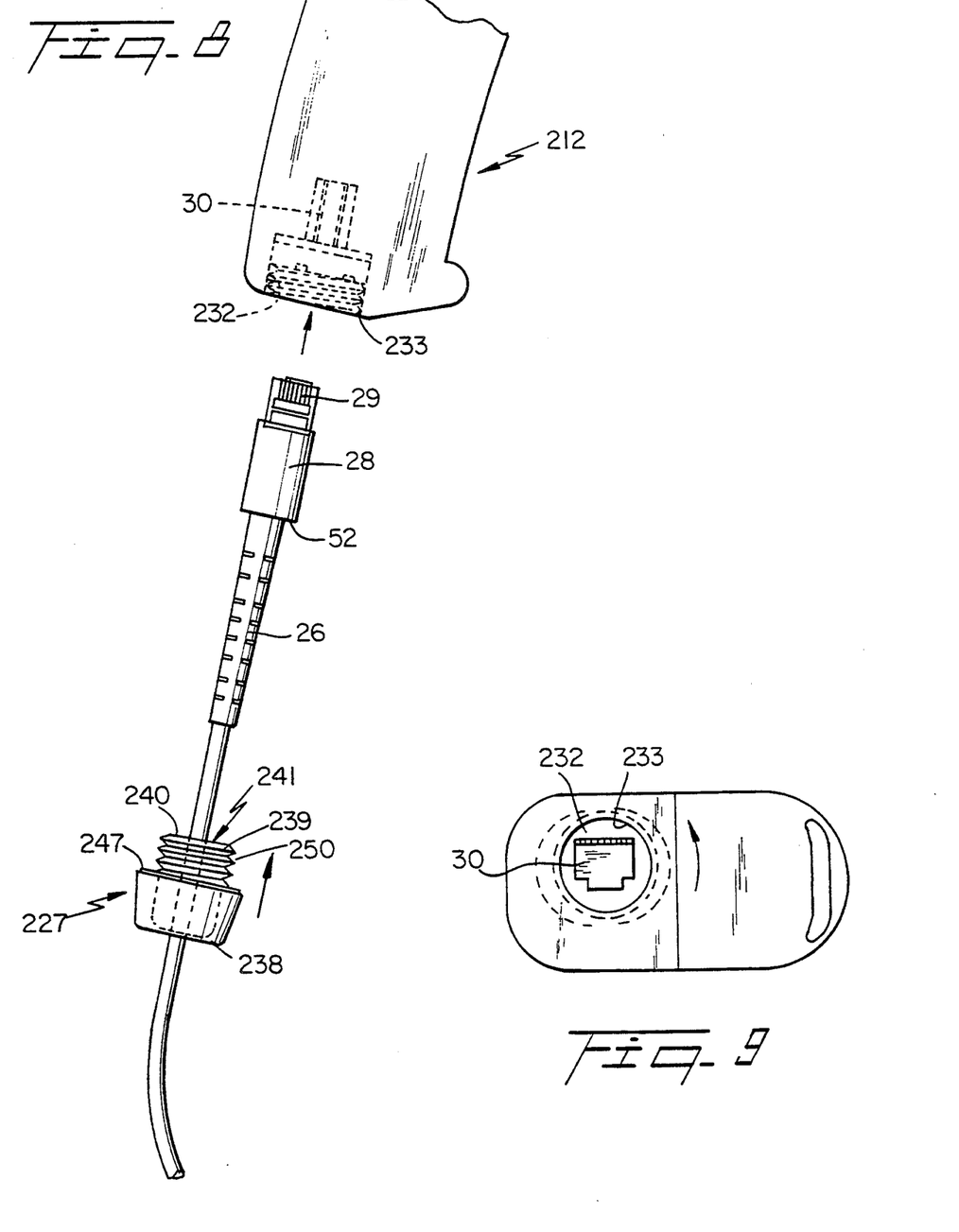
FIG. 8 is an exploded view of the locking connector assembly according to a second embodiment of the invention.
FIG. 9 is a bottom view of the handle of the hand-held bar code reader of FIG. 8 depicting details of the electrical socket mounted therein.

In particular, as shown in FIGS. 8 and 9, screw type locking retaining member 227 receives cylindrical connector body 28 in a central bore formed in member 227. A remaining portion of cylindrical connector body 28 is received into handle cavity 232 so that connector 29 couples with connector 30 mounted in the opposite wall of the handle cavity. Member 227 includes longitudinally contiguous lower collar 238 and threaded member 239. An axial bore 240 extends from an open end 241 of threaded member 239 as previously described in connection with the embodiment of FIG. 2.

The generally cylindrical outer portion of collar 238 is formed substantially as described in connection with the first embodiment including opposing flats to provide for manual gripping and rotation of member 227. A gasket 247 is mounted or formed on collar 238 surrounding threaded member 239 for sealing member 227 to handle 212 around aperture 233.

Threaded member 239 is formed as a barrel having a threaded outer surface complementary to tapped inner side walls of handle cavity 232. Threaded member 239 cooperates with the tapped handle to screw into the bottom of the handle thereby drawing gasket 247 of retaining member 227 into a sealed position against the lower surface of handle 212. In the sealed position, cylindrical connector body 28 is positioned within a cavity formed by cavity 232 and axial bore 240 so that connector 29 engages mating connector 30 mounted in the opposite wall of the handle cavity 232.

From the above detailed description of the presently preferred embodiment, it should be clear that the invention provides an environmentally protected cable connector assembly adaptable to a variety of connector types. Because cable strain is transmitted directly to the case of the scanner through the retaining member, stress transmitted to the internal connector is minimized. This improves reliability, reduces connector failures, and accommodates a variety of connector types not otherwise suitable for use with a flexible instrument cable. Further, the invention provides a universal assembly for a variety of connectors including coaxial, multi-pin electrical, and fiber optic cables.

We claim:

1. In a laser scanning system for reading indicia having portions of different light reflectivity, said system being of the type including a housing having an upper head portion and a handle portion having an electrical socket in a cavity in an end portion thereof;

light source means in the head for generating an incident laser beam;

optic means in the head for optically forming and directing the incident laser beam along an optical path toward indicia located in the optical path, thereby reflecting off the indicia reflected laser light, at least a returning portion of which travels away from the indicia back toward the system;

scanning means in the head for scanning the indicia in a scan across the indicia, said returning portion of the reflected laser light having a variable intensity over the scan;

sensor means in the head for detecting the variable intensity of the returning portion of the reflected laser light over a field of view, and for generating an electrical analog signal indicative of the detected variable light intensity, said scanning means being operative for scanning at least one of said incident laser beam and said field of view;

signal processing means for processing the analog electrical signal, and for supplying a processed signal indicative of the indicia to said electrical socket; and an electrical cable removably connected to the electrical socket and operative for conducting said processed electrical signal to external equipment, the improvement comprising:

a connector member attached to a terminal end of said electrical cable assembly, said connector member including a terminal electrical connector engagable with said electrical socket and a sleeve adjacent said terminal electrical connector, and a retaining member positionable over said sleeve, said retaining member having an internal stepped bore forming a collar at an end of said retaining member for retaining said sleeve within said bore and a locking portion at an opposite end of said retaining member cooperating with an internal surface of said handle portion for securing said retaining member to said handle portion whereby said terminal electrical connector is maintained coupled with said electrical socket, wherein said retaining member has (i) an external flange formed between said collar and said locking portion and (ii) a gasket mounted on said flange for seating said retaining member onto an outer surface of said handle portion surrounding said cylindrical cavity.

2. The improvement as recited in claim 1, wherein said internal surface of said handle portion has an internal screw thread and said locking portion comprises a complementary external screw thread cooperating with said internal screw thread for securing said retaining member to said handle portion.

3. The improvement as recited in claim 2 wherein said handle portion includes a cavity having an external aperture formed for receiving said locking portion of said retaining member, said socket mounted in an internal wall of said cavity opposite said aperture, side walls of said cavity including said internal screw thread.

4. The improvement as recited in claim 1, wherein said internal surface of said handle portion comprises a bearing surface and said locking portion comprises a bayonet portion cooperating with said internal bearing surface for securing said retaining member to said handle portion.

5. The improvement as recited in claim 4 wherein said handle portion includes a cavity having an external aperture formed as a keyway for receiving said bayonet portion of said retaining member, said socket mounted in an internal wall of said cavity opposite said aperture, side walls of said cavity including said bearing surface.

6. The improvement as recited in claim 4, wherein said retaining member includes a barrel portion having a plurality of radially extending tabs, each tab having a ramped bearing surface for engaging said internal bearing surface of said handle portion whereby rotation of said retaining member within said handle portion draws said retaining member into sealed engagement with said handle portion.

7. The improvement as recited in claim 4, wherein said handle portion includes the cylindrical cavity in an end thereof for receiving said bayonet portion of said retaining member, side wall surfaces of said cavity having a stepped portion forming said bearing surface.

8. The improvement as recited in claim 1 wherein said cavity is cylindrical.

9. The improvement as recited in claim 7, wherein said stepped portion comprises a groove.

10. The improvement as recited in claim 1 wherein said retaining member includes opposing flat outer surface portions providing a gripping surface for transmitting a torque to said retaining member for rotating said retaining member within said handle portion into locking engagement therewith.

11. The improvement as recited in claim 1 wherein said connector member includes a flexible cable strain relief portion surrounding a portion of said electrical cable assembly and extending out of said bore of said retaining member with said retaining member secured within said handle portion.

12. The improvement as recited in claim 1 wherein said electrical socket comprises a standard modular telephone jack.

13. The improvement as recited in claim 1, wherein said gasket is injection molded directly onto said retaining member.

14. The improvement as recited in claim 1 wherein said retaining member is an electrical insulator.

15. An electronic device for detecting a signal and supplying the detected signal to an external device, said electronic device comprising:

a housing having a connector for supplying a signal;

signal detector means for receiving a signal and supplying said received signal to said connector;

a signal cable removably connected to the connector and operative for supplying said received signal to the external device, said signal cable including (i) a connector member attached to a terminal end thereof and engagable with said connector of said housing and (ii) a collar portion adjacent said terminal connector; and a retaining member positionable over said collar, said retaining member having (i) an internal stepped bore forming a collar at one end of said retaining member for engaging said collar portion of said signal cable within said bore and (ii) a manually lockable portion formed at an opposite end of said retaining member cooperating with an internal surface of said housing for securing said retaining member to said housing whereby said connector member is maintained coupled with said connector of said housing;

wherein said housing includes a cavity, and said retaining member includes (i) an external flange between said collar and said manually lockable portion and (ii) a gasket mounted on said flange for seating said retaining member onto an outer surface of said housing surrounding said cylindrical cavity.

16. The electronic device as recited in claim 15, wherein said retaining member includes means for manual rotation thereof whereby said retaining means engages said internal surface of said handle portion.

17. The electronic device as recited in claim 15 wherein said internal surface of said housing has an internal screw thread and said manually lockable portion of said retaining member includes a barrel having a complementary external screw thread for engaging said internal screw thread of said housing whereby rotation of said retaining member within said housing draws said retaining member into engagement with said housing.

18. The electronic device as recited in claim 15 wherein said manually lockable portion of said retaining member includes a barrel having a plurality of radially outwardly extending tabs, each tab having a ramped bearing surface for engaging said internal surface of said housing whereby rotation of said retaining member within housing draws said retaining member into engagement with said housing.

19. The electronic device as recited in claim 15, wherein said housing includes a cylindrical cavity in an end surface thereof for receiving said barrel portion of said retaining member.

20. The electronic device as recited in claim 15, wherein said cavity is cylindrical.

21. The electronic device as recited in claim 15 wherein said retaining member includes opposing flat surface portions providing a gripping surface for transmitting a torque to said retaining member for rotating said retaining member within said housing into locking engagement therewith.

22. The electronic device as recited in claim 15 wherein said connector member includes a flexible cable strain relief portion surrounding a portion of said cable and extending out of said bore of said retaining member with said retaining member secured within said housing.

23. The electronic device as recited in claim 15 wherein said retaining member comprises a locking bayonet portion and said housing includes a cavity having an external aperture formed as a keyway for receiving said locking bayonet portion of said retaining member, said connector of said housing mounted in an internal end wall of said cavity opposite said aperture.

24. The electronic device as recited in claim 15 wherein said connector of said housing comprises a standard modular telephone jack.

25. The electronic device as recited in claim 15, wherein said gasket is injection molded directly onto said flange member.

26. The electronic device is recited in claim 15, wherein said retaining member is electrically non-conductive.

27. A hand-held scanner for reading indicia having portions of different light reflectively, said scanner comprising:

a housing having a handle with a cylindrical cavity and a connector in the handle at an one end of said cylindrical cavity for carrying electrical signals;

said housing including a laser source, means for scanning light supplied by said laser source and a signal detector circuit for receiving reflected light, converting the reflected light to a corresponding data signal and supplying said data signal to said connector;

a signal cable removably connected to the connector and operative for supplying said data signal to an external device, one end of said signal cable including a complementary connector engagable with said housing connector; and a retaining member positionable over said signal cable assembly with a tapered internal bore in a first portion thereof for retaining said cable assembly and a second portion insertable into said cylindrical cavity for manually locking said retaining member to said handle for maintaining said complementary connector coupled with said housing connector;

wherein said retaining member has an external flange between said tapered internal bore and said second portion and a gasket mounted on said flange for seating said retaining member onto an outer surface of said handle surrounding said cylindrical cavity.

* * * * *